Figure 1:
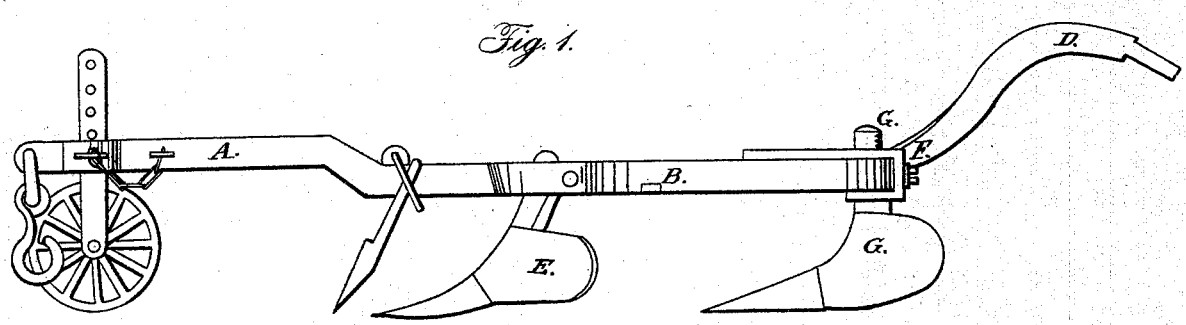
Figure 2:
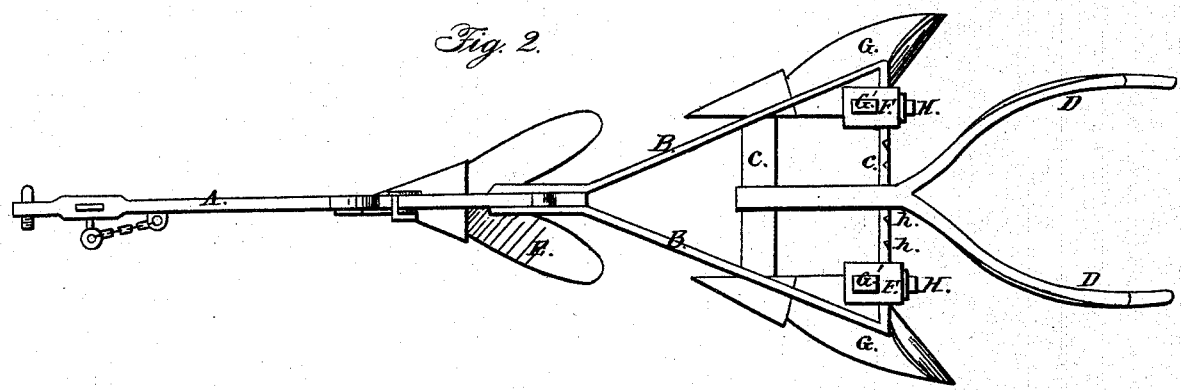

W. RICHARDSON.
Cultivator.

No. 68,901.                        Patented Sept. 17, 1867.

United States Patent Office.

WILLIAM RICHARDSON, OF HOOKSTOWN, MARYLAND.

Letters Patent No. 68,901, dated September 17, 1867.

IMPROVEMENT IN PLOUGHS.

The Schedule referred to in these Letters Patent and making part of the same.

TO ALL WHOM IT MAY CONCERN:

Be it known that I, WILLIAM RICHARDSON, of Hookstown, in the county of Baltimore, and State of Maryland, have invented a new and useful Improvement in Vegetable-Ploughs; and I do hereby declare the following to be a full, clear, and exact description of the same, reference being had to the accompanying drawings, forming part of this specification, and in which the figure is a perspective view of my invention.

In this invention, of the three plough points the forward one is removable and the two rear ones are adjustable both laterally and vertically. The object in constructing a plough in this manner is to adapt it to ploughing between rows of different distances apart, and to adjust it either to surface or subsoil ploughing, as may be desired. It also pulverizes the ground more thoroughly than the common plough.

In order that others skilled in the art to which my invention appertains may be enabled to make and use the same, I will proceed to describe it in detail.

In the drawings, A represents the draw-beam of my improved plough, B B the side beams, C C' the cross-beams, and D D the handles attached to the cross-beams C C. The shape of the frame is an equilateral triangle, having the draw-beam attached at the vertex. At the same point the forward plough E is attached to the draw-beam and frame, a pin or key confining its standard or shank in place and allowing the plough to be removed when desired. This plough has a double mould-board, throwing the dirt on either side. F F are boxes sliding laterally on the rear cross-beam C, which passes through slots in the boxes. The boxes have also a vertical slot, through which, in front of the cross-beam C, pass the vertical shanks or standards of the rear ploughs G G. Set-screws H H enter the rear sides of the boxes F and work against the rear side of the beam C. By means of these set-screws the boxes are confined in their place on the beam C, and the ploughs are confined in their place in the boxes.

It is evident from the above description that the boxes may be confined at any point on the beam C, and the ploughs G G may be confined in the boxes so as either to cut very deeply or very lightly in the soil, as may be desired by the operator. The rear ploughs G G are made "right and left." This position, as shown in the drawing, may be reversed, in which case they will throw the dirt inward. When the forward plough E is in place and the rear ploughs are adjusted to throw the dirt inward, the soil will be thoroughly pulverized, being first thrown outward and then intercepted and thrown in again by the rear ploughs. The forward plough may be removed and the two rear ploughs brought close together when it is desired to use the instrument as a common double mould-board plough, or either of the rear ploughs may be removed at pleasure. The instrument may in this manner be readily adjusted as a "breaking-up" plough, a side-hill plough, a corn-plough, a surface or subsoil plough, or for thoroughly pulverizing or harrowing ground that has before been ploughed. The cross-beam C may be graduated, as at $h\ h$, to indicate precisely where to set the boxes. The plough-shanks may also be graduated to show exactly the depth required to be ploughed.

Having thus described my invention, what I claim as new, and desire to secure by Letters Patent, is-

1. The boxes F F, substantially as and for the purpose described.
2. The graduated beam C, for the purpose specified.
3. The graduated plough-shanks or plough-standards G' G', for the purpose specified.
4. The arrangement of the removable plough E with the adjustable and removable ploughs G G, substantially as and for the purpose specified.
5. The combination of the plough-shanks G' G', the boxes F F, the set-screws H H, and the cross-beam C, substantially as and for the purpose specified.

WM. RICHARDSON.

Witnesses:
   JOHN S. STANSBERY,
   N. K. ELLSWORTH.